United States Patent [19]

Nomura et al.

[11] 4,212,954

[45] Jul. 15, 1980

[54] POLYURETHANE FOAM PRODUCT FOR AN IMPACT ABSORBER

[75] Inventors: Takao Nomura, Nagoya; Kunihiko Terasaka; Isao Sakata, both of Toyota, all of Japan

[73] Assignee: Toyota Jidosha Kogyo Kabushiki, Kaisha, Japan

[21] Appl. No.: 823,193

[22] Filed: Aug. 9, 1977

[30] Foreign Application Priority Data

Aug. 10, 1976 [JP] Japan .................................. 51-95058

[51] Int. Cl.² .......................................... C08G 18/14
[52] U.S. Cl. .................................... 521/159; 521/174
[58] Field of Search ................. 260/2.5 AM, 2.5 BE; 521/159, 174

[56] References Cited

U.S. PATENT DOCUMENTS

| | | | |
|---|---|---|---|
| 3,876,569 | 4/1975 | Priest | 260/2.5 BE |
| 3,926,867 | 12/1975 | Quock | 260/2.5 BE |
| 3,931,066 | 1/1976 | Puig | 260/2.5 AM |
| 3,939,106 | 2/1976 | Dunleavy | 260/2.5 BE |
| 3,945,939 | 3/1976 | Barron | 260/2.5 AM |
| 3,982,691 | 3/1975 | White | 260/2.5 AM |
| 4,020,001 | 4/1977 | White | 260/2.5 AM |
| 4,060,439 | 11/1977 | Rosemund | 260/2.5 BE |
| 4,076,654 | 2/1978 | Yukuta | 260/2.5 AM |

OTHER PUBLICATIONS

Saunders et al., Polyurethanes, Part II, Interscience, NY, 1964, pp. 7 & 8.

*Primary Examiner*—Maurice J. Welsh
*Attorney, Agent, or Firm*—Cooper, Dunham, Clark, Griffin & Moran

[57] ABSTRACT

A polyurethane foam which absorbs impact effectively is prepared by cross-linking short chain polyol to high polymer polyol chains by using polyisocyanate.

5 Claims, No Drawings

POLYURETHANE FOAM PRODUCT FOR AN IMPACT ABSORBER

BACKGROUND OF THE INVENTION

The present invention relates to a polyurethane foam for an impact absorber.

More paticularly, the invention relates to a polyurethane foam for a impact absorber which is suitable to bumper core of motor vehicle and the like.

DESCRIPTION OF THE PRIOR ART

The polyurethane foam for an ideal impact absorber must satisfy the following four terms:

(1) Fast recovery of strain which is caused by impact force.

(2) Fast recovery of hardness reduced by an impact obeying linear dynamics as closely as possible.

(3) Low temperature dependency of hardness:

(4) High absorption efficiency of impact energy.

Hitherto several methods have been tried to satisfy above mentioned terms.

For example, a polyurethane foam which is produced by the reaction 30 to 70 weight % of which is produced by the reaction of 30 to 70 weight % of a long chain polymer polyol having OH value of 20 to 160, 0 to 18 weight % of a short chain polyol having OH value of 450 to 1850 with 30 to 50 weight % of an aromatic polyisocyanate wherein diphenyl methane di-isocyanate is mainly employed by using a water as a blowing agent is disclosed in Japanese Patent Application Open No. 155592/1975 and a polyurethane foam which is produced by the reaction of 70 to 90 weight parts of a polymer polyol having molecular weight of 4000 to 8000, 10 to 30 weight parts of an amine and/or polyol having isocyanate equivalent value of 50 to 150 and a di-isocyanate prepolymer being equivalent to isocyanate index of 90 to 115, by adding 0 to 2 weight parts of a catalyst and 3 to 5 weight parts of water is disclosed in Japanese Patent Application Open No. 18800/1976. The former shows a desirable strain and hardness recovery rate and a desirable absorption efficiency of impact energy but on the other hand it shows undesirablly high temperature dependence of hardness. The latter shows a desirable temperature dependence of hardness and a desirable absorption efficiency of impact energy but on the other hand it shows undesirably small strain and hardness recovery rate.

SUMMARY OF THE INVENTION

Accordingly, an object of the invention is to provide a polyurethane foam which satisfy above mentioned four terms.

In the above mentioned four terms, it seems especially imcompatible to have a polyurethane foam which shows large recovery rate of both strain and hardness, and a low temperature dependence of hardness at the same time.

However, the inventors of the invention have found that an excellent polyurethane foam satisfying said four terms at the same time can be obtained by selecting polymer polyol having large molecular weight.

Thus, the invention particullarly relates to a polyurethane foam prepared by mixing a high polymer polyol (a), short chain polyol (b), polyisocyanate (c), water, and if necessary, inert blowing agent and catalysts.

DETAILED DESCRIPTION OF THE PREFERRED EMBODIMENTS

A polyurethane foam for an impact absorber according to the invention is prepared by mixing a high polymer polyol (a), a short chain polyol (b), polyisocyanate (c), water, and further if necessary inert blowing agent and catalysts.

A high polymer polyol (a) is prepared by the graft polymerisation of a polyether type polyol having molecular weight of 6000 to 8000 with 15 to 30 weight %, and generally 20 weight % of acrylonitrile or comonomer of acrylonitrile and styrol and has a large molecular weight and OH value of 14 to 20. A polymer polyol having OH value less than 14 shows a remarkably high viscosity because of its extremely large molecular weight causing low foamability and moldability.

For a short chain polyol (b) the OH value is desirably 450 to 1850 and more desirably 1,000 to 1850. Suitably polyols (b) are such as ethylene glycol, propylene glycol, butylene glycol, glycerin, trimethylol propane, Trimethyrol ethane, 1,2,6-hexane triol, pentaerythritol, diethylene glycol, dipropylene glycol, addition-products of ethylene diamine to alkylene oxide, addition products of polyalcohol to alkylene oxide and the like. A polyisocyanate (c) is a compound having more than two isocyanate groups in one molecular. Suitable poly isocyanates (c) are such as paraphenylene diisocyanate, 2-chloro-1,4-phenyl diisocyanate, 2,4-toluene diisocyanate, 2,6-toluene diisocyanate, 1,4-naphthalene diisocyanate, hexamethylene diisocyanate, 4,4-diphenyl diisocyanate, 4,4-diphenyl methane diisocyanate, 3,3-dimethyl-4,4-diphenyl diisocyanate, 3,3-dimethyl-4,4-diphenyl methane diisocyanate, 3,3-dimethoxy-4,4-diphenyl diisocyanate, 1-chloro-2,4-phenylene diisocyanate, m-phenylene diisocyanate, p-phenylene diisocyanate, 2,2.5,5-penta methyl 4,4-biphenylene diisocyanate, $\omega,\omega$-m-xylylene diisocyanate and the like. The invention is not specified to the above mentioned examples. The same amounts of the above mentioned polyisocyanate may be used as in the case of the preparation of an useful polyurethane foam, i,e the isocyanate index 100 to 115 may be suitable. Thus, a polyurethane foams generally prepared by mixing 100 parts by weight of high polymer polyol (a): 3 to 10 parts by weight of short chain polyol (b) and an equivalent amount of isocyanate index of 100 to 115 of polyisocyanate (c). If desirablly, the inert blowing agent, such as tri-chloro-mono-fluoro methane, di-chloro, di-fluoro methane, and the catalyst, such as amine compound, organic heavy metal compound, are added to the mixture on the amount of 0 to 10 parts by weight and 0 to 3 parts by weight respectively. Above mentioned composite gives a polyurethane foam product by water-blowing in a closed mold. Amount of water added in the case of water-blowing is 2 to 5 parts by weight.

Polyurethane foam product prepared by above mentioned procedure has excellent mechanical properties because of a high polymer polyol used as one of the components. The relation between OH value of high polymer polyol (a) and the mechanical properties of the resulted polyurethane foam product is shown in the following experiments.

Experiments

A polyurethane foam which has the following composition is prepared and the density of the products adjusted to be 0.1.

| Component | Parts by weight |
| --- | --- |
| polymer polyol(a) | 100 |
| Ethylene glycol(b) | 7 |
| Diphenylmethane diisocyanate equivalent to isocyanate index of 105 | |
| Dibutyl tin dilaurate | 0.02 |
| Triethylene diamine | 0.2 |
| Water | 3 |

In the experiment, the high polymer polyols (a) used are a polyether type polymer polyols and have 20 weight % of acrylonitrile graft ratio and various OH values. Relations between OH value of polymer polyol (a) and mechanical properties are shown in Table I Table I

| OH value | Temperature dependence of hardness (times) | Recovery rate of strain (%) | Absorption efficiency of impact energy (%) | Recovery rate of hardness (%) |
| --- | --- | --- | --- | --- |
| 16 | 1.5 | 96 | 75 | 78 |
| 18 | 1.8 | 98 | 76 | 75 |
| 20 | 2.0 | 97 | 75 | 80 |
| 22 | 2.1 | 96 | 77 | 75 |
| 29 | 2.5 | 97 | 76 | 78 |

Temperature dependence of hardness: with a test piece of $400 \times 10 \times 10$ cm attached to a fixed block let another block weighted 500 kg collide at a velocity of 8 km/h. Thus, a load generated by the collision (impact load) is measured. In this case, the impact load in measured at the point of strain rate 0.5 that is hardness in this case is presented as 50% impact load defection. Said experiments are carried out at -15° C. and 55° C. and the ratio of the impact load of the latter ($F_2$) to that of the former ($F_1$), ($F_2/F_1$) is caluculated. It is desirable that ($F_2/F_1$) is less than 2 for use as a bumper of motor vehicle.

Recovery rate of strain: The same impact test is carried out and the ratio of the thickness of the test pieces prior to the test, $t_1$, and that after the test, $t_2$, ($t_1/t_2 \times 100$) is calculated. It is desirable that the value of ($t_1/t_2 \times 100$) is more than 95 for use as a bumper of the motor vehicle.

Absorption efficiency of impact energy: The same impact test as above mentioned one is carried out at room temperature and a stress-strain curve $f(\gamma)$ is obtained. Then $$\int_0^{0.5} f(\gamma) \, d\gamma / 0.5 \times f(0.5) \times 100$$

is calculated.

Recovery rate of hardness: The same impact test is carried out twice at an interval of 30 minutes at room temperature, and the impact loads are measured at the point of strain rate 0.5. The ratio of the impact loads at the first time, $F_1$ and that at the second time $F_2$, ($F_1/F_2 \times 100$) is calculated. It is desirable that ($F_1/F_2 \times 100$) is more than 70.

As indicated in Table I, The polyurethane which is prepared by using high polymer polyol (a) having OH value of less than 20 shows excellent mechanical properties but these prepared by using high polymer polyol (a) having OH value less than 14 are extremely viscous, therefore it is almost impossible to stir and cast the mixture.

EXAMPLE 1

A mixture of the followng composition is prepared by using a high polymer polyol (a) having OH value 16 and molecular weight 7500. Said high polymer (a) mainly consists of two functional polyether polyol grafted with 12 weight % of acrylonitrile and 12 weight % of styrol.

| | Parts by weight |
| --- | --- |
| High polymer polyol(a) | 100 |
| 1,4-butanediol(b) | 10 |
| Stannous octoate | 0.015 |
| Triethylene diamine | 0.2 |
| Trichloro mono fluoro methane | 5 |
| Water | 3 |

Said components are mixed by a hand mixer then the resulting mixture is kept at 20° to 25° C. Trilene diisocyanate prepolymer (Shoeprene 10p: Mitsui-Nisso Urethane Co. NCO content: 29.5%) kept at 20° to 25° C. is added to the mixture in the equivalent to isocyanate index of 110 and mixed again then casted into a mold which is heated at 40° to 50° C. The expansion molding is carried out to give a polyurethane foam product whose density is 0.10. In the case of above-mentioned molding, the creaming time is 15 to 20 second and the molding time is about 15 minutes. The product removed from the mold, is presented for the test after incubation for 2 or 3 days.

EXAMPLE 2

A mixture of the following composition is prepared by using a high polymer polyol (a) having OH value 18 and molecular weight 7000. Said high polymer polyol (a) mainly consists of three functional polyether polyol grafted with 20 weight % of acrylonitrile.

| | Parts by weight |
| --- | --- |
| High polymer polyol (a) | 100 |
| Ethylene glycol (b) | 5 |
| Dibutyl tin dilaurate | 0.02 |
| Triethylene diamine | 0.2 |
| Water | 2.5 |

Said components are mixed in the same manner as Example 1, then diphenyl methane diisocyanate prepolymer (Millionate MTL: Nippon Polyurethane Co. NCO content 29.0%) is added to the mixture in the equivalent amount to isocyanate index of 107 and the expansion molding is carried out in the same manner as Example 1.

EXAMPLE 3

A mixture of the following composition is prepared by using a high polymer polyol (a) having OH value 18 and molecular weight 8000. Said high polymer polyol (a) mainly consists of three functional polyether polyol grafted with 18 weight % of acrylonitrile.

| | Parts by weight |
| --- | --- |
| High polymer polyol (a) | 100 |
| Trimethylol propane(b) | 5 |
| Dibutyl tin dilaurate | 0.02 |
| Triethylene diamine | 0.2 |
| Trichloro monofluoro methane | 5 |

| | Parts by weight |
|---|---|
| Water | 3 |

Said components are mixed in the same manner as Example 1, then diphenyl methane diisocyanate prepolymer (Sumidur PV-1555: Sumitomo Bayer Urethane Co, NCO content 26%) is added to the mixture in the equivalent amount to isocyanate index of 105 and the expansion molding is carried out in the same manner as Example 1.

EXAMPLE 4

A mixture of the following composition is prepared by using a high polymer polyol (a) having OH value 16 and molecular weight 6000. Said high polymer polyol (a) mainly consists of two functional polyether polyol grafted with 20 weight % of acrylonitrile.

| | Parts by weight |
|---|---|
| High polymer polyol(a) | 100 |
| Diethylene glycol | 7 |
| Stannous octoate | 0.02 |
| Triethylene diamine | 0.2 |
| Water | 3 |

Said components are mixed in the same manner as Example 1, then tolylene diisocyanate prepolymer (Shoeprene 10 p: Mitsui-Nisso Urethane Co, NCO content 29.5%) is added to the mixture in the equivalent to isocyanate index of 110 and the expansion molding is carried out in the same manner as Example 1.

EXAMPLE 5

A mixture of the following composition is prepared by using the same high polyol as that of Example 2.

| | Parts by weight |
|---|---|
| High polymer polyol (a) | 100 |
| 1,4-butane diol (b) | 10 |
| Dibutyl tin dilaurate | 0.02 |
| Triethylene diamine | 0.2 |
| Water | 3.5 |

Said components are mixed in the same manner as Example 1, then diphenyl methane diisocyanate prepolymer (Sumidur PV-1555: Sumitomo-Bayer Urethane Co, NCO content 26%) is added to the mixture in the equivalent amount to isocyanate index of 103 and the expansion molding is carried out in the same manner as Example 1.

Mechanical properties of polyurethane foam products prepared in above mentioned Examples are shown in Table 2.

Table 2

| Example | 1 | 2 | 3 | 4 | 5 |
|---|---|---|---|---|---|
| Recovery rate of strain (%) | 98 | 97 | 95 | 98 | 97 |
| Recovery rate of hardness (%) | 80 | 75 | 75 | 76 | 75 |
| Temperature dependence of hardness (Times) | 1.8 | 1.7 | 1.6 | 1.9 | 1.7 |
| Absorption efficiency of impact energy (%) | 75 | 78 | 76 | 74 | 77 |
| Density (g/cm) | 0.09 | 0.10 | 0.12 | 0.10 | 0.11 |

As indicated in Table 2, each polyurethane foam product prepared in above mentioned Examples has excellent mechanical properties when used as a bumper core of the motor vehicle.

We claim:

1. A polyurethane foam product useful as a ideal impact absorber prepared by miximg a high molecular weight polymer polyol (a) having a molecular weight in the range 6000-8000 and a corresponding OH value in the range 14-20, a low molecular weight polyol (b) having an OH value in the range 450-1850, an organic polyisocyanate (c), water and a catalyst and permitting the resulting mixture to react with the formation of said polyurethane foam product.

2. A polyurethane foam product useful as an ideal impact absorber in accordance with claim 1 prepared by mixing 100 parts by weight of said high molecular weight polymer (a), 2-10 parts by weight of said low molecular weight polyol (b) and an amount of said polyisocyanate (c) equivalent to an isocyanate index of 100-115, 2-5 parts by weight of water, 0-10 parts by weight of an inert blowing agent and up to 3 parts by weight of said catalyst.

3. A polyurethane foam product useful as an ideal impact absorber in accordance with claim 1 wherein said high molecular weight polymer polyol (a) is a polyether polyol.

4. A polyurethane foam product useful as an ideal impact absorber in accordance with claim 1 wherein said high molecular weight polymer polyol (a) is a polyether polyol grafted with acrylonitrile.

5. A polyurethane foam product useful as an ideal impact absorber in accordance with claim 1 wherein said high molecular weight polymer polyol (a) is a polyether polyol grafted with 15-30% by weight of acrylonitrile.

* * * * *